United States Patent [19]
Abe et al.

[11] Patent Number: 6,165,054
[45] Date of Patent: Dec. 26, 2000

[54] DOUBLE SIDE GRINDING APPARATUS AND DOUBLE SIDE POLISHING APPARATUS

[75] Inventors: Kohzo Abe, Gumma; Sho Isobe, Kanagawa; Yoshiyuki Tomita, Kanagawa; Kazutoshi Hara, Kanagawa; Ryuzo Masaki, Ehime; Akio Iwase, Ehime; Hiroshi Nagata, Ehime, all of Japan

[73] Assignees: Super Silicon Crystal Research Institute Corp.; Sumitomo Heavy Industries, Ltd., both of Japan

[21] Appl. No.: 09/252,083

[22] Filed: Feb. 18, 1999

[30] Foreign Application Priority Data

Mar. 4, 1998 [JP] Japan .................................. 10-069579

[51] Int. Cl.⁷ ...................................................... B24B 7/00
[52] U.S. Cl. ............................................................. 451/262
[58] Field of Search .................................... 451/262, 268, 451/269, 63

[56] References Cited

U.S. PATENT DOCUMENTS

| | | | |
|---|---|---|---|
| 3,736,818 | 6/1973 | Ennis | 451/6 |
| 3,783,718 | 1/1974 | Kuhne et al. | 451/142 |
| 4,198,183 | 4/1980 | Kummer et al. | 451/393 |
| 4,546,573 | 10/1985 | Shiba et al. | 451/5 |
| 4,604,833 | 8/1986 | Kimura et al. | 451/14 |
| 4,763,448 | 8/1988 | Yoshioka et al. | 451/14 |
| 5,906,535 | 5/1999 | Tonooka et al. | 451/24 |

*Primary Examiner*—M. Rachuba
*Attorney, Agent, or Firm*—Lorusso & Loud

[57] ABSTRACT

A double side grinding apparatus and a double side polishing apparatus, with a narrow tolerance range, reduces pitching errors, and ensures a sufficient level of rigidity against the force of reaction to machining, while enhancing positioning accuracy. The double side grinding apparatus or a double side polishing apparatus includes a plurality of guideways for supporting and shifting main spindles, and these plural guideways on end define a geometric center matched with the center of gravity of the main spindles. The number of the guideways is preferably three in order not to obstruct the mounting and removal of a workpiece.

8 Claims, 5 Drawing Sheets

DOUBLE SIDE GRINDING APPARATUS AND DOUBLE SIDE POLISHING APPARATUS

BACKGROUND OF THE INVENTION

1. Technical Field

The present invention relates to a double side grinding apparatus suitable for grinding both opposing surfaces of a workpiece simultaneously, or a double side polishing apparatus suitable for polishing both sides of a work simultaneously, where flatness and parallelism of both surfaces are required.

2. Background Art

Applications of semiconductor silicon wafers, optics, compact disks, minidisks and the like require their surfaces to be strictly flat and parallel to each other, and the requirement is increasing in strictness every year. Conventionally, a double side grinding apparatus is known as an apparatus capable of grinding and finishing both surfaces of a workpiece simultaneously with high efficiency, providing flatness and parallelism to both surfaces. The variation in final accuracy of a workpiece that is machined by using this double side grinding apparatus is usually a few $\mu$m in flatness as well as in parallelism.

FIG. 1 shows a front elevation of one example of a conventional horizontal double side grinding apparatus, and FIG. 2 shows its profile. The double side grinding apparatus shown in FIGS. 1 and 2 is so arranged that the open sides of two cupped-type grinding wheels 1a and 1b, each having a flat grinding end face, are set facing each other and move in a manner permitting simultaneous contact with both sides of a workpiece 2 to grind them.

In the double side grinding apparatus shown in FIGS. 1 and 2, main spindles are given relative rotational movement by spindle motors, and the cupped-type grinding wheels 1a and 1b are fitted detachably at the ends of two opposite main spindles 3a and 3b having the same rotational axis. Thus, the grinding surfaces of the cupped-type grinding wheels 1a and 1b face each other. Each of the main spindles 3a and 3b is retained and restrained by a sliding or ball-and-roller guide 4. The guide 4 is fixed on a bed 8, and in a horizontal double side grinding apparatus, it is generally located underneath the main spindles 3a and 3b, with two guides disposed in parallel to the rotational axis of the main spindles 3a and 3b.

The rotating force of the main spindles 3a and 3b is transmitted by spindle motors 5 disposed above the main spindles 3a and 3b via driving belts. In addition, while FIG. 1 shows a horizontal double side grinding apparatus, a vertical double side grinding apparatus has a similar structure rearranged in the vertical direction.

The above-described conventional double side grinding apparatus has ball-and-roller bearings used for rotating the main spindles. In order to ensure the rotating accuracy of such spindles, angular contact ball bearings are placed opposite to each other and pressure is preloaded, or conical bearings are used for ensuring rigidity, but these means usually have limits, a tolerance of 1 $\mu$m in accuracy and 20 kgf/$\mu$m in rigidity.

Further, in the above-mentioned conventional double side grinding apparatus, sliding guideways are mostly used for the guides in consideration of damping, though, in the case of achieving minute movement at a positioning tolerance of 1 $\mu$m or less, such guides are subject to sticking attributable to pitching errors in the grinding planes.

Furthermore, in the above-mentioned conventional double side grinding apparatus, as shown in FIG. 2, the distances between a working point 7 in the grinding plane of the cupped-type grinding wheels 1a and 1b and the guide way 4, and between the working point 7 and a motion center 6, are spaced apart from each other, and the greater the diameter of the main spindles 3a and 3b, the wider these distances, so that this tendency becomes increasingly conspicuous as the size of the work enlarges. However, the wider distances become between the working point 7 and the guideway 4, and between the working point 7 and the motion center 6, the more difficult it becomes to ensure sufficient rigidity, and the problem that the measuring inaccuracies caused by the Abbe's error occur.

On the other hand, recently, for example, for optical glass, or semiconductor silicon wafers, while the required accuracy of machined planes has been increasing in strictness every year, the grinding apparatus is inevitably made larger by the increased size of silicon wafers and the like. In order to ensure the accuracy of flatness to submicrons and that of surface roughness to little over 10 nm, for the finished state of workpieces by grinding with a double side apparatus, it is necessary to achieve a sufficient level of rigidity against the reaction force at the time of machining as well as a positioning tolerance of 10 to 100 nm.

It is therefore an object of the present invention to provide a double side grinding apparatus to solve or reduce the aforesaid problem, and, more specifically, to provide a double side grinding apparatus and a double side polishing apparatus capable of enhancing the accuracy, ensuring rigidity against the reaction force at the time of machining as well as reducing pitching errors.

DISCLOSURE OF THE INVENTION

In order to solve the aforesaid problems, the double side grinding apparatus or the double side polishing apparatus according to the present invention is an apparatus for grinding or polishing both sides of a workpiece simultaneously, wherein the working surfaces of grinding wheels or polishing cloths fitted at the end faces of two opposing main spindles are brought into contact with opposing sides of a workpiece and the main spindles are rotated. The apparatus has a plurality of guide supporting mechanisms for supporting and transporting the main spindles, and a geometric center defined by a plurality of the guideway supporting mechanisms viewed on end, which geometric center is closely or perfectly matched with the center axis of the main spindles.

According to the present invention, the geometric center defined by all the guideways, which is closely or perfectly matched with the center axis of the main spindles, comes close to the working point of the double side grinding apparatus or the double side polishing apparatus. Therefore, the bending component of the reaction force, generated by the machining when a workpiece is ground by the main spindles, can be reduced and the spindles can be rigidly supported against the force of reaction to machining.

In the double side grinding apparatus or the double side polishing apparatus according to the present invention, it is necessary, in order to match the geometric center defined by the guideways with the center axis of the main spindles, that the number of the aforesaid guideways be not fewer than three, and in order to prevent the guide members having the guideways from obstructing the mounting or removal of a workpiece, three guideways are most preferable.

In the case of using a horizontal double side grinding apparatus or a horizontal double side polishing apparatus and three guideways, the following combinations are preferable for the arrangement of the guideways and their supporting mechanisms. A first combination consists of two guideways disposed on the horizontal face under the main spindles and one disposed on the upper side of the main spindles. A second combination consists of two guideways disposed on the horizontal face on the upper side of the main spindles and one disposed on the lower side of the main spindles. In each case, it is preferable that the three guide ways and their supporting mechanisms be arranged to form a triangle on end or, more specifically, a regular triangle and that the main spindle be disposed at the geometric center of gravity thereof. The double side grinding apparatus or the double side polishing apparatus according to the present invention consisting of such an arrangement is not limited to the horizontal type, and the arrangement of the plurality of guideways is also applicable to a vertical version.

A plurality of the guideways in the double side grinding apparatus or the double side polishing apparatus according to the present invention may include at least one formed integral with the bed, column, etc.

The plural guideway mechanisms according to the present invention may include different types. Specifically, when applied to a horizontal double side grinding apparatus or a horizontal double side polishing apparatus, the guideway mechanism disposed on the upper side of the main spindles should desirably be a hydrostatic guideway mechanism, or the guideways disposed on the upper and under sides of the main spindles can be a combination of the hydrostatic type guideway mechanisms and sliding type guideway mechanisms.

DESCRIPTION OF SYMBOLS 1a, 1b: cupped-type grinding wheels; 2: workpiece; 3a, 3b: main spindles; 4: guide; 5a, 5b: spindle motors; 6: motion center; 7: working point; 8: bed; 11a, 11b: cupped-type grinding wheels; 12: workpiece; 13: main spindles; 14a, 14b, 14c, 14d: guideways; 15: saddle; 16: spindle stock; 17: bed; 18: guideway member.

DETAILED DESCRIPTION OF THE PREFERRED EMBODIMENTS

Figure 1:
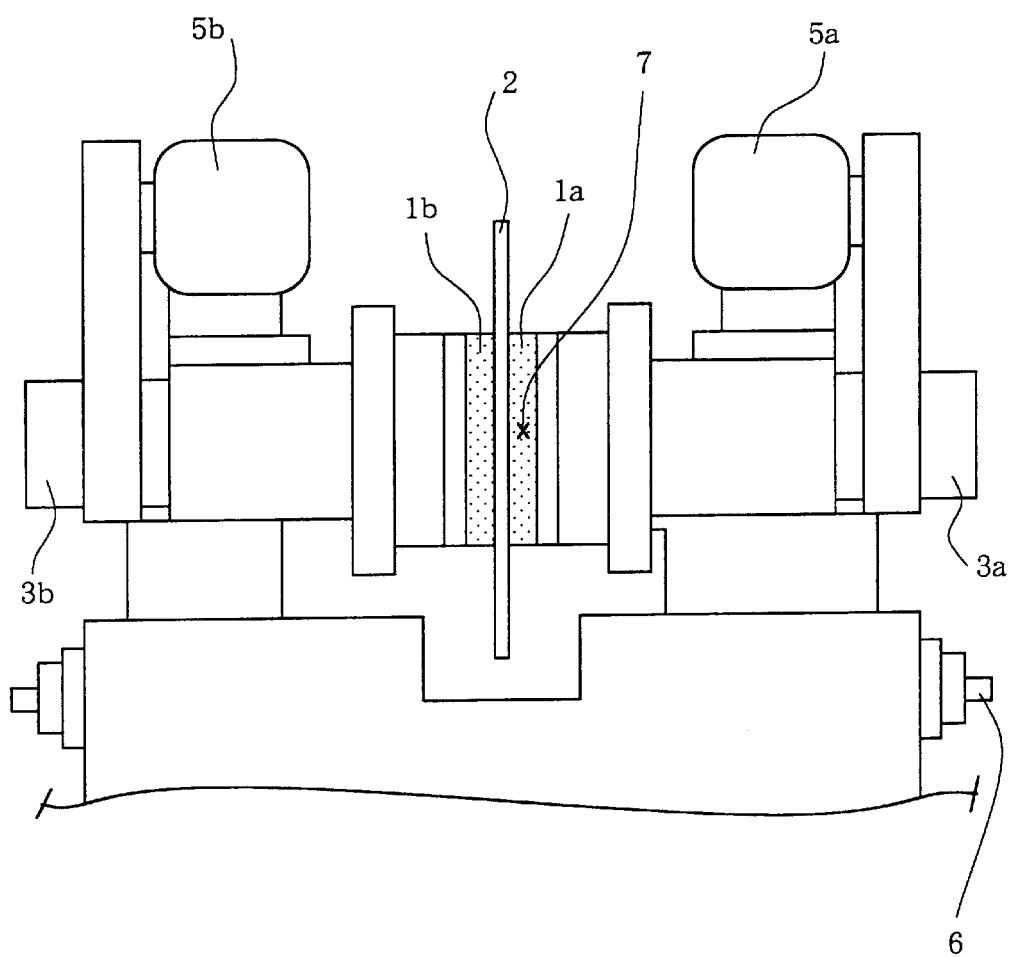
FIG. 1 is a front elevation of one example of a conventional horizontal double side grinding apparatus.
Figure 2:
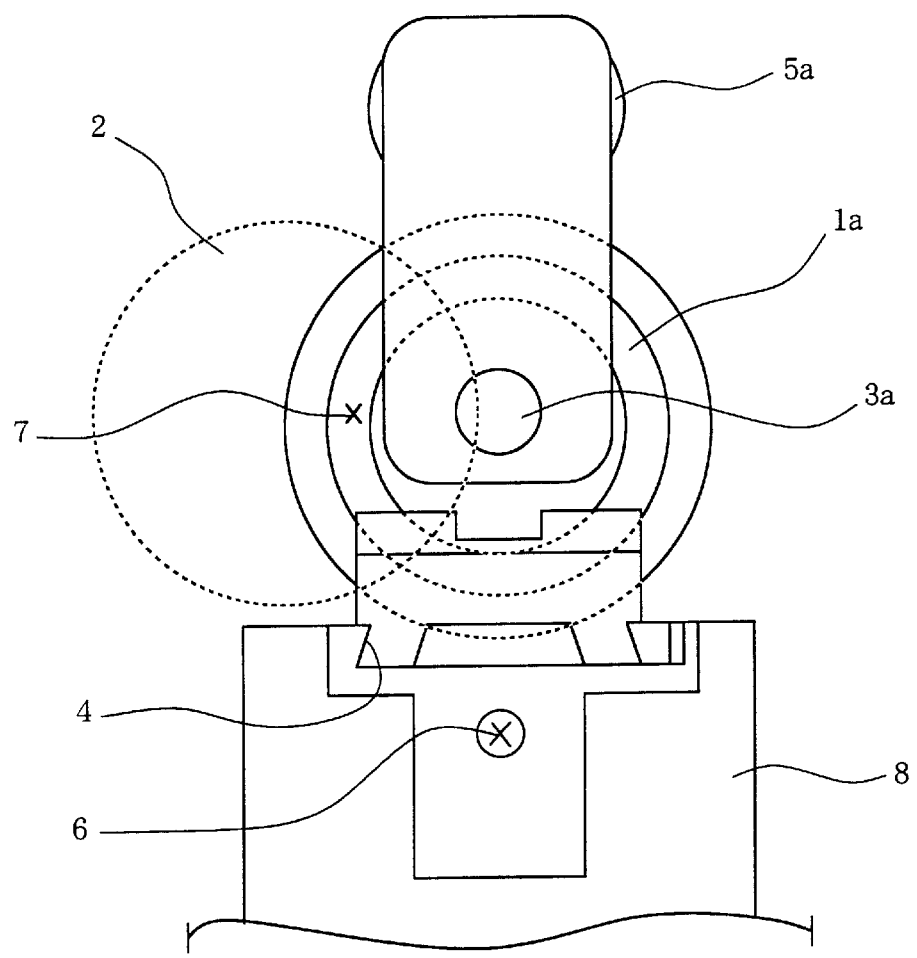
FIG. 2 is an end view of the conventional horizontal double side grinding apparatus shown in FIG. 1.
Figure 3:
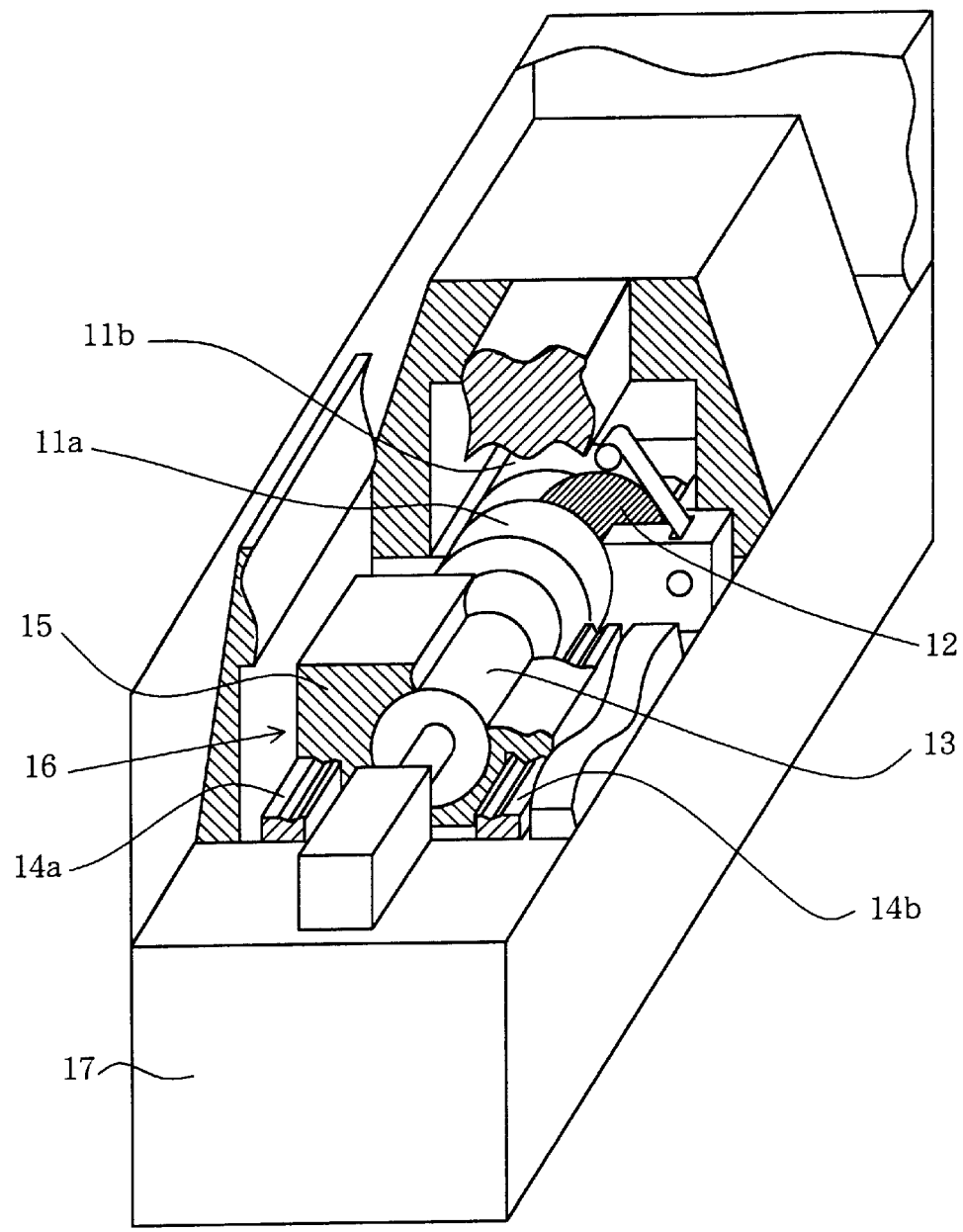
FIG. 3 is a perspective view of one embodiment of a double side grinding apparatus according to the present invention.
Figure 4:
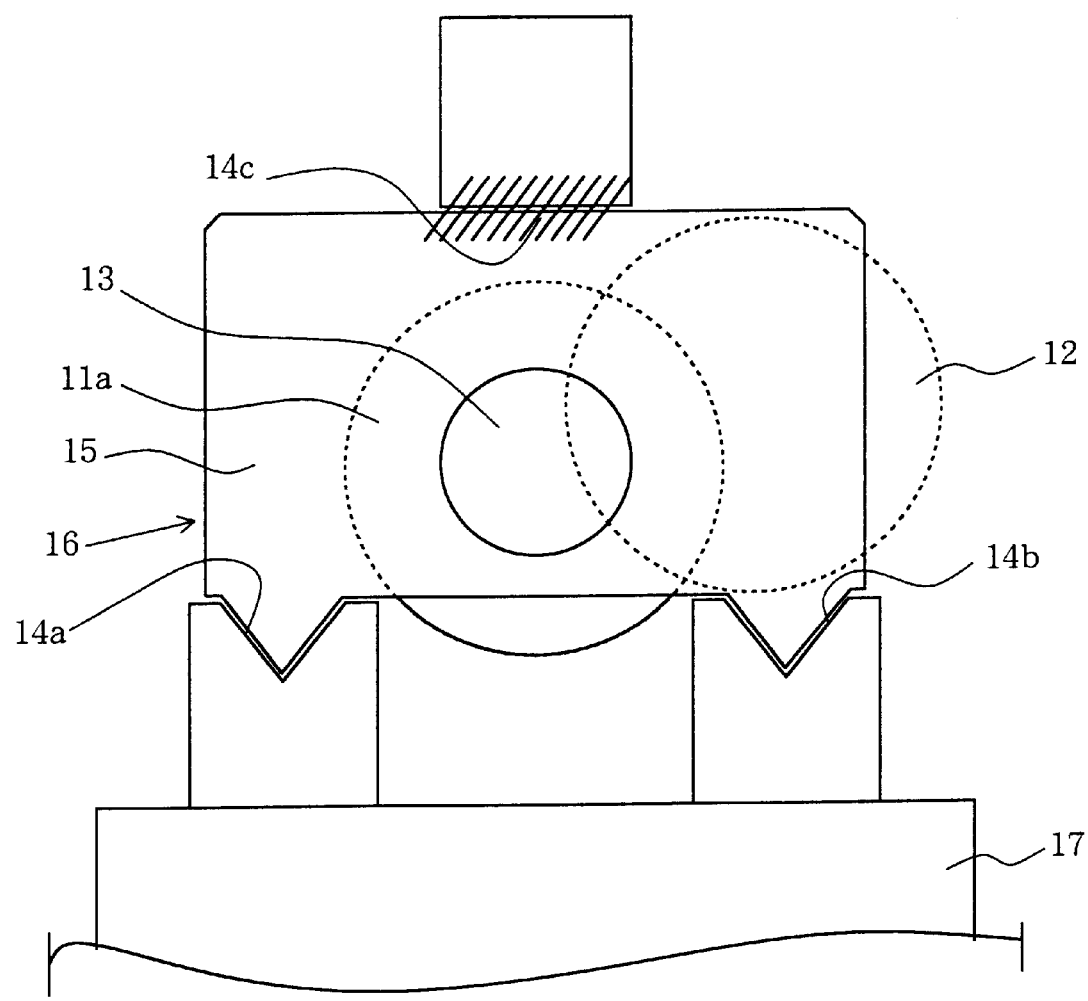
FIG. 4 is an end view of the embodiment of the double side grinding apparatus according to the present invention shown in FIG. 3.

One embodiment of a double side grinding apparatus according to the present invention is shown in FIG. 3 in a perspective view and in FIG. 4 in a profile. In the double side grinding apparatus shown in FIGS. 3 and 4, two main spindles 13 are disposed opposite to each other so that two cupped-type grinding wheels 11a and 11b having flat grinding end faces are set facing each other and move in a manner permitting simultaneous contact with opposing sides of a workpiece 12 to grind them. The main spindles 13 are each supported by a saddle 15 to form a spindle stock 16.

Two slide guideways 14a and 14b are fixed to a bed 17, and thereby disposed in the same horizontal plane and fit mating surfaces on the bottom face of the spindle stock 16. Each slide guideway 14a and 14b is a V-shaped groove. The upper face of the spindle stock 16 is formed so as to mate with a guideway 14c, i.e., the upper guideway, shown in FIG. 4 as a hydrostatic guideway mechanism. These two slidable guideways 14a and 14b and the guideway 14c are arranged in a triangle, or more specifically a regular triangle, in end view and the main spindle is disposed at the geometric center of gravity thereof.

As the lower guideways 14a and 14b are slide mechanisms, damping can be ensured. In addition, as the upper guideway 14c is a hydrostatic guideway mechanism, the pitching errors attributable to the lower guide ways 14a and 14b can be minimized. Since the pitching errors can be reduced in such a manner, the geometric center defined by the plural guideways is set to be positioned at the center axis of the main spindle. For the driving source in the direction of the cut into the main spindle 13, a cylinder or a linear motor can be used.

While three guideways are provided, two disposed under the spindle stock and one disposed in contact with the upper face of the spindle stock, in the embodiment shown in FIGS. 3 and 4, a combination of two upper guideways in the form of hydrostatic guideway mechanisms and one lower guideway in the form of a slide guideway mechanism may be used as an alternative embodiment.

Figure 5:
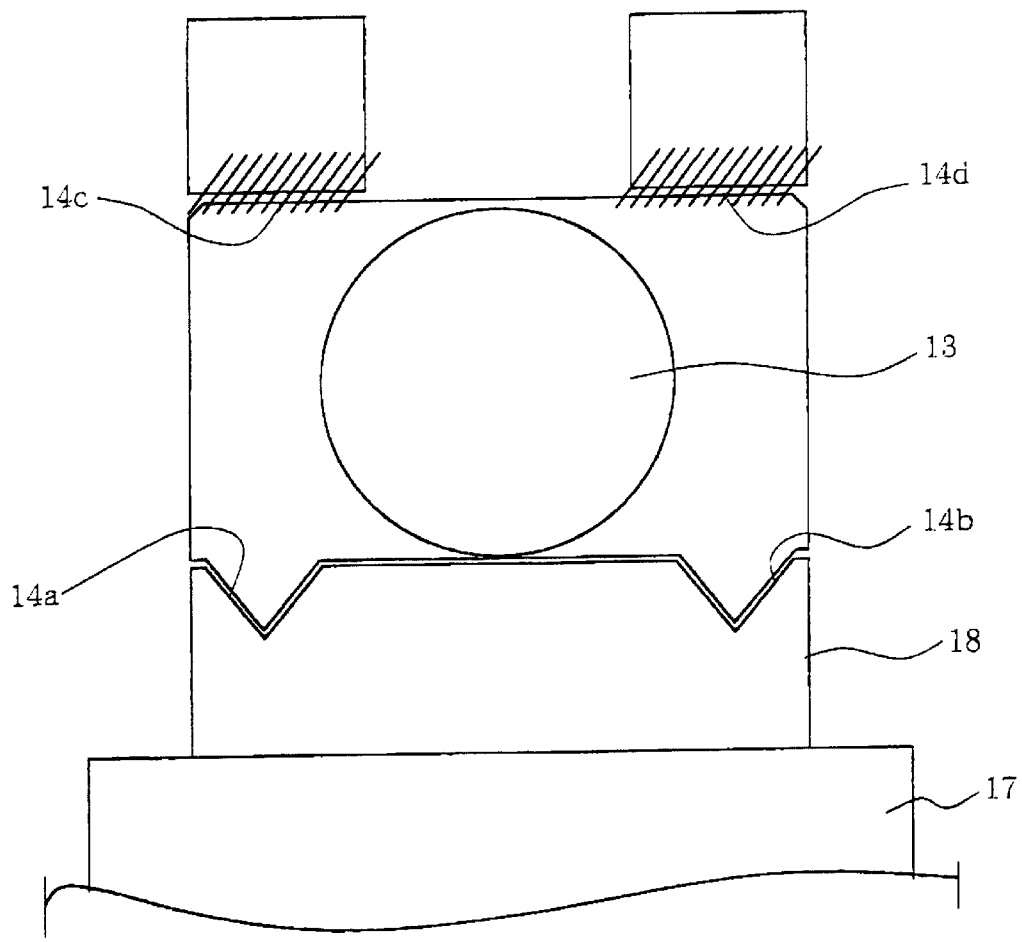
FIG. 5 is an end view of another embodiment of a double side grinding apparatus according to the present invention.

Another embodiment of the present invention is shown in FIG. 5. As shown in FIG. 5, one guideway member 18 having a plurality of guideways may be used, and two guideways 14c and 14d of a hydrostatic guideway mechanism may be disposed on the upper side.

Although the number of the guideways should preferably be three in order to prevent them from obstructing the mounting and removal of a workpiece, the total number of the guideways 18 may be four or more if this problem is overcome.

A hydrostatic bearing can be used for rotatably supporting the main spindles in the double side grinding apparatus according to the present invention. In this case, oil or water can be applied as the hydrostatic medium, and it can ensure an accuracy and rigidity that cannot be obtained with a ball-and-roller bearing. For example, the ball-and-roller bearing has a tolerance of about 1 $\mu$m, but the hydrostatic bearing can narrow the tolerance to 0.01 to 0.1 $\mu$m.

Although the above-described embodiment is a double side grinding apparatus, if the grinding member mounted at the end of the main spindle is replaced with a polishing member, it can be used as a double side polishing apparatus as well.

The center of gravity defined by a plurality of guideways, preferably three, for supporting and shifting the main spindles in a double side grinding apparatus or a double side polishing apparatus, is closely or perfectly matched with the central axis of rotation of the main spindle so that the bending component of the reaction force to the machining when a workpiece is ground by the main spindles can be made smaller and rigidity against the reaction force to the machining can be ensured more easily.

Where hydrostatic bearings are used for the main spindles, the range of variation can be narrowed from the order of microns is to that of submicrons, and adequate rigidity can also be ensured.

Where a plurality of sliding guideway mechanisms and hydrostatic guideway mechanisms are used in combination, the pitching errors can be reduced.

Where the aforesaid requirements are satisfied, a double side grinding apparatus or a double side polishing apparatus according to the present invention ensures a sufficient level of rigidity against the reaction force of machining as well as achieves a positioning accuracy with a tolerance in a range of 10 to 100 nm.

What is claimed is:

1. A double side abrading apparatus for simultaneously working opposite sides of a workpiece, said apparatus comprising:

a bed;

a pair of spindles for supporting working tools for rotation about a center axis, at least one of said spindles being slidably mounted on said bed for movement toward the other spindle to engage the workpiece between the working tools;

a plurality of guide supporting mechanisms for supporting said one spindle for sliding movement relative to said bed, said plurality of guide supporting mechanisms defining a geometric center of gravity in end view, said geometric center of gravity being located on said center axis.

2. A double side abrading apparatus, as claimed in claim 1, wherein the number of said guide supporting mechanisms is three.

3. A double side abrading apparatus, as claimed in claim 1, comprising a saddle rotatably supporting said one spindle between opposing surfaces of said saddle, wherein two of said guide supporting mechanisms are disposed in parallel on one of said surfaces of said saddle and one guide supporting mechanism is disposed on the other of said surfaces of said saddle, said guide supporting mechanisms defining a triangle in end view, said geometric center of gravity being the geometric center of gravity of said triangle.

4. A double side abrading apparatus, as claimed in claim 3, wherein said center axis is horizontal and wherein one surface of said saddle is disposed in a horizontal plane above said center axis and said other surface of said saddle is disposed in a horizontal plane below said center axis.

5. A double side abrading apparatus, as claimed in claim 3, wherein said center axis is horizontal and wherein said one surface of said saddle is disposed in a horizontal plane below said center axis and said other surface of said saddle is disposed in a horizontal plane above said center axis.

6. A double side abrading apparatus, as claimed in claim 1, wherein the number of said guide supporting mechanisms is four.

7. A double side abrading apparatus, as claimed in claim 6, wherein said plurality of said guide supporting mechanisms define a four-sided polygon in end view and wherein said geometric center of gravity is the geometric center of gravity of said polygon.

8. A double side abrading apparatus, as claimed in claim 1, wherein, a guide supporting mechanism disposed on one side of said spindle is a hydrostatic guideway and a guide supporting mechanism disposed on a side of said spindle opposite said one side is a sliding guideway.

* * * * *